| (12) | United States Patent | (10) Patent No.: | US 7,305,815 B2 |
|---|---|---|---|
| | Utaki et al. | (45) Date of Patent: | Dec. 11, 2007 |

(54) CABLE PROTECTION AND GUIDE DEVICE

(75) Inventors: Akihiko Utaki, Osaka (JP); Masaaki Ikeda, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/634,041

(22) Filed: Dec. 5, 2006

(65) Prior Publication Data

US 2007/0163795 A1    Jul. 19, 2007

(30) Foreign Application Priority Data

Jan. 19, 2006    (JP)    ............................. 2006-011196

(51) Int. Cl.
*F16G 13/16*    (2006.01)
*F16G 3/04*    (2006.01)

(52) U.S. Cl. ............................. 59/78.1; 248/49; 248/51

(58) Field of Classification Search ................. 59/78.1; 248/49, 51

See application file for complete search history.

(56) References Cited

U.S. PATENT DOCUMENTS

| 5,635,675 | A | 6/1997 | Houga | |
| 6,516,602 | B2 * | 2/2003 | Sakai et al. | ................... 59/78.1 |
| 6,725,642 | B2 * | 4/2004 | Tsutsumi et al. | ............ 59/78.1 |
| 6,745,555 | B2 * | 6/2004 | Hermey et al. | .............. 59/78.1 |
| 6,984,782 | B2 * | 1/2006 | Ikeda et al. | .............. 174/21 JS |
| 7,204,075 | B2 * | 4/2007 | Utaki | ......................... 59/78.1 |
| 2003/0182924 | A1 | 10/2003 | Tsutsumi et al. | |

FOREIGN PATENT DOCUMENTS

| JP | 2003-299238 | 10/2003 |
| WO | WO/086349 A1 | 10/2002 |

OTHER PUBLICATIONS

U.S. Appl. No. 11/499,328, Tsubakimoto.
U.S. Appl. No. 11/271,551, Tsubakimoto.

* cited by examiner

*Primary Examiner*—David B Jones
(74) *Attorney, Agent, or Firm*—Woodling, Krost and Rust

(57) ABSTRACT

Breakage in a coupling portion of a side plate subjected to repeated flexure is prevented by using fatigue resistant resin materials in the side plate. The coupling portion of the side plate due is subjected to repeated flexure. Excellent fatigue resistance is realized. The fatigue resistant resin material is selected from the group of an elastomer—or rubber component—compounded polyamide resin and polybutylene terephthalate resin. The rubber component is selected from the group of ethylene-propylene rubber (EPDM), nitrile rubber (NBR) and butyl rubber (IIR).

5 Claims, 8 Drawing Sheets

CABLE PROTECTION AND GUIDE DEVICE

TECHNICAL FIELD

The present invention relates to a cable or the like protection and guide device. More specifically, it relates to a cable or the like protection and guide device suitable for accommodating a cable or the like. A cable (cables), a hose (hoses) or the like is accommodated. The cable typically supplies a movable member of an industrial machine with electric power or compressed air. The cable is safely and reliably guided and protected during movement of the movable portion.

BACKGROUND TECHNOLOGY

A conventional cable or the like protection and guide device includes an energy guide chain in which side plates are connected to each other with coupling elements separate from the side plate. See, for example, Patent Reference 1, Japanese Patent Indication No. 2004-527706.

Alternatively, another conventional cable or the like protection and guide device includes side plates connected to each other by fitting connecting rods integrally formed on each side plate to connecting grooves between the side plates. See, for example, Patent Reference 2, Japanese Laid-Open Patent Publication No. 2003-299238

PROBLEMS TO BE SOLVED BY THE INVENTION

In the energy guide chain of Patent Reference 1, since a side plate and a coupling element are separately formed from each other, a significant number of manufacturing parts are required which requires significant assembly time. Further, since the side plates and coupling elements are separtely formed, mutual connection and disconnection of the side plates takes considerable maintenance time and effort.

Further, in the energy guide chain as in the Patent Reference 1, since side plates are connected to each other by fitting coupling elements separate from the side plate between the side plates, a problem developed. Displacements were gradually generated between a side plate and a connecting member by repeated flexure between links and result in breakage of the chain by disconnection of such a side plate at a coupling portion. Further there was a problem even when no displacement between a side plate and a coupling element occurred because excessive stress concentration was generated at the coupling portion during a flexional operation so that the coupling portion was prematurely broken.

Further, in the energy guide chain in the Patent Reference 1, when flexional operations are repeated for a long period of time, there was a problem that a coupling element is concentrically fatigued and the chain was prematurely broken. Further, since wear powders generated by wearing of a slide portion of a side plate scatter, there was a problem that the guide chain could not be used in a clean environment.

In the cable or the like protection and guide device as in the Patent Reference 2, since a connecting rod formed in a manner protruding outside a side edge of the side plate also serves as a flexional portion for flexibly connecting link bodies to each other and the connecting rod has a configuration to support a load on a side plate during restriction of mutual flexion of connecting side plates, there was a possibility that the flexional portion composed of connecting rods would be broken so that a the service life of the guide device would be shortened. That is, in the protection and guide device of the Patent Reference 2, there was a problem that the connecting rod is broken by the load applied during flexure and the service life of the guide device is shortened.

And, in the protection and guide device of Patent Reference 2, since the side plates are connected to each other by fitting a connecting rod between the side plates into a connecting groove, there was a problem that displacements were gradually generated between the connecting rod between the side plates and the connecting groove by repetition of flexional operations between link bodies. The displacements caused the destruction (breakage) of the guide device through the disconnection of the side plate at a coupling portion. Further there was a problem even when no displacement between the connecting rod and the connecting groove in the coupling portion occurs because an excessive stress concentration is generated at the proximal portion of the connecting rod during a flexional operation so that a connecting rod protruding from the side plate can be prematurely broken.

In the protection and guide device of Patent Reference 2, when flexional operations are repeated for a long period of time, a problem occurred when the connecting rod is concentrically fatigued and the chain was prematurely broken. Further, since wear powders generated by wearing of a slide portion of a side plate can scatter, there was a problem that the guide chain could not be used in a clean environment.

SUMMARY OF THE INVENTION

Accordingly, the object of the present invention is to solve the above-mentioned problems. A cable or the like protection and guide device, in which breakage, which is liable to occur in a coupling portion of a side plate due to the repetition of flexional operations is prevented so that excellent fatigue resistance is exhibited wear powders in a slide portion of a side plate are suppressed enabling use in a clean environment.

MEANS FOR SOLVING THE PROBLEMS

The invention attains the above-mentioned object by a cable or the like protection and guide device in which a number of right and left pairs of spaced side plates are connected to each other in a longitudinal direction. Connecting arms are bridged over flexional inner circumferential sides and flexional outer circumferential sides of the side plates at predetermined intervals. A cable is accommodated in a cable accommodating space surrounded by the side plates and the connecting arms along the longitudinal direction. Each of the side plates is molded by use of a fatigue resistant resin material and is formed of a front side plate portion connected to a preceding side plate, a rear side plate portion connected to a subsequent side plate and a flexible coupling portion interposed between the front side plate portion and the rear side plate portion in an integrated manner.

And the invention attains the above-mentioned object wherein the fatigue resistant resin material is an elastomer- or rubber component-compounded polyamide resin or polybutylene terephthalate resin. Further, the invention attains the above-mentioned object wherein said elastomer is styrene-ethylene-butylene-styrene (SEBS). Further, the invention attains the above-mentioned object wherein the rubber component is one of the rubbers selected from ethylene-propylene rubber (EPDM), nitrile rubber (NBR) and butyl rubber (IIR).

EFFECTS OF THE INVENTION

A number of pairs of right and left side plates are connected to each other in a longitudinal direction. Connecting arms are bridged over flexional inner circumferential sides and flexional outer circumferential sides of the side plates at predetermined intervals. A cable can be accommodated in a cable accommodating space surrounded by the side plates and the connecting arms along the longitudinal direction.

The side plate is molded by use of a fatigue resistant resin material and is formed of a front side plate portion connected to a preceding side plate, a rear side plate portion connected to a subsequent side plate and a flexible coupling portion intervened between the front side plate portion and the rear side plate portion in an integrated manner. A coupling portion made of a fatigue resistant resin is flexibly provided for repeated flexion. Thus breakage, which is liable to occur in the coupling portion of the side plate due to the repetition of flexional operations, is prevented and excellent fatigue resistance can be exhibited. The cable or the like protection and guide device suppresses wear powders in the slide portion of the side plate and can be used in a clean environment.

Further, the fatigue resistant resin material is an elastomer—or rubber component—compounded polyamide resin or polybutylene terephthalate resin. The elastomer or the rubber component adds strong flexibility to impact resistance by being compounded into polyamide resin or polybutylene terephthalate resin. Thus an excellent fatigue resistance to repeated flexion is achieved.

A cable or the like protection and guide device in which a number of pairs of right and left spaced side plates are connected to each other in a longitudinal direction is disclosed. The connecting arms are bridged over flexional inner circumferential sides and flexional outer circumferential sides of said side plates at predetermined intervals. A cable or the like is accommodated in a cable accommodating space surrounded by the side plates and the connecting arms along the longitudinal direction. The side plate is molded by use of a fatigue resistant resin material and is formed of a front side plate portion connected to a preceding side plate, a rear side plate portion connected to a subsequent side plate and a flexible coupling portion interposed between the front side plate portion and the rear side plate portion in an integrated manner. Breakage, which is liable to occur in a coupling portion of the side plate due to repetition of flexional operations, is prevented and an excellent fatigue resistance is exhibited.

When an elastomer—or rubber component—compounded polyamide resin or polybutylene terephthalate resin is used as a fatigue resistant resin material of a side plate in the cable or the like protection and guide device according to the present invention, the elastomer or rubber component exhibits strong flexibility to impact resistance by being compounded into polyamide resin or polybutylene terephthalate resin and more preferably exhibits excellent fatigue resistance to repeated flexion.

Further, although the cable or the like protection and guide device according to the present invention includes a linear position holding surface for holding a cable or the like in a linear position and also includes a flexional position restricting surface for restricting the cable or the like, the linear position holding surface and the flexional position restricting surface may be provided on any portion on the flexional outer circumferential side or flexional inner circumferential side of a side plate other than a coupling portion of the side plate. The linear position holding surface and the flexional position restricting surface may be provided even on an end surface or a side surface of the side plate.

For example, when the linear position holding surface is formed on a flexional outer circumferential side portion rather than the coupling portion of the side plate and the flexional position restricting surface is formed on a flexional inner circumferential side portion rather than the coupling portion of the side plate, a load, which is liable to occur at the coupling portion, which becomes a flexional portion during the flexional position restriction, is avoided so that excellent endurance can be exhibited and the linear connection state and the flexional connection state can be reliably held. Thus such an arrangement of the linear position holding surface and the flexional position restricting surface is preferred.

Further, when the linear position holding surface is formed on a flexional outer circumferential side portion rather than the coupling portion of the side plate and on a flexional inner circumferential side portion rather than the coupling portion thereof, and the flexional position restricting surface is formed on a flexional outer circumferential side portion rather than the coupling portion of the side plate and on a flexional inner circumferential side portion rather than the coupling portion of the side plate, a load, which is liable to occur at the coupling portion, which becomes a flexional portion during the flexional position restriction, is avoided so that excellent endurance can be exhibited. A surface contact load between side plates is generated during the flexional position restriction and during the linear position holding. The surface contact load is dispersed into two parts on the flexional outer circumferential side and the flexional inner circumferential side. The linear connection state and the flexional connection state can be endurably and reliably held. Thus such an arrangement of the linear position holding surface and the flexional position restricting surface is preferred.

And a form of a concave portion/convex portion engagement mechanism provided between a rear side plate portion of a preceding side plate and a front side plate portion of a side plate subsequently connected to the rear side plate portion in the cable or the like protection and guide device of the present invention may be any concave portion/convex portion engagement forms. For example, a first engagement protrusion and a hole to be engaged, disposed on a front end surface or a side surface in a front side plate portion of a side plate may be used. And, a portion to be engaged or a second engagement protrusion disposed on a rear end surface or a side surface in a rear side plate portion of the side plate opposite to the first engagement protrusion or the hole may be used.

The drawings will be better understood when reference is made to the Description of the Invention and claims which follow hereinbelow.

DESCRIPTION OF THE INVENTION

Example

A cable or the like protection and guide device 100, which is an example of the present invention, will be described with reference to FIGS. 1 to 9.

Figure 1:
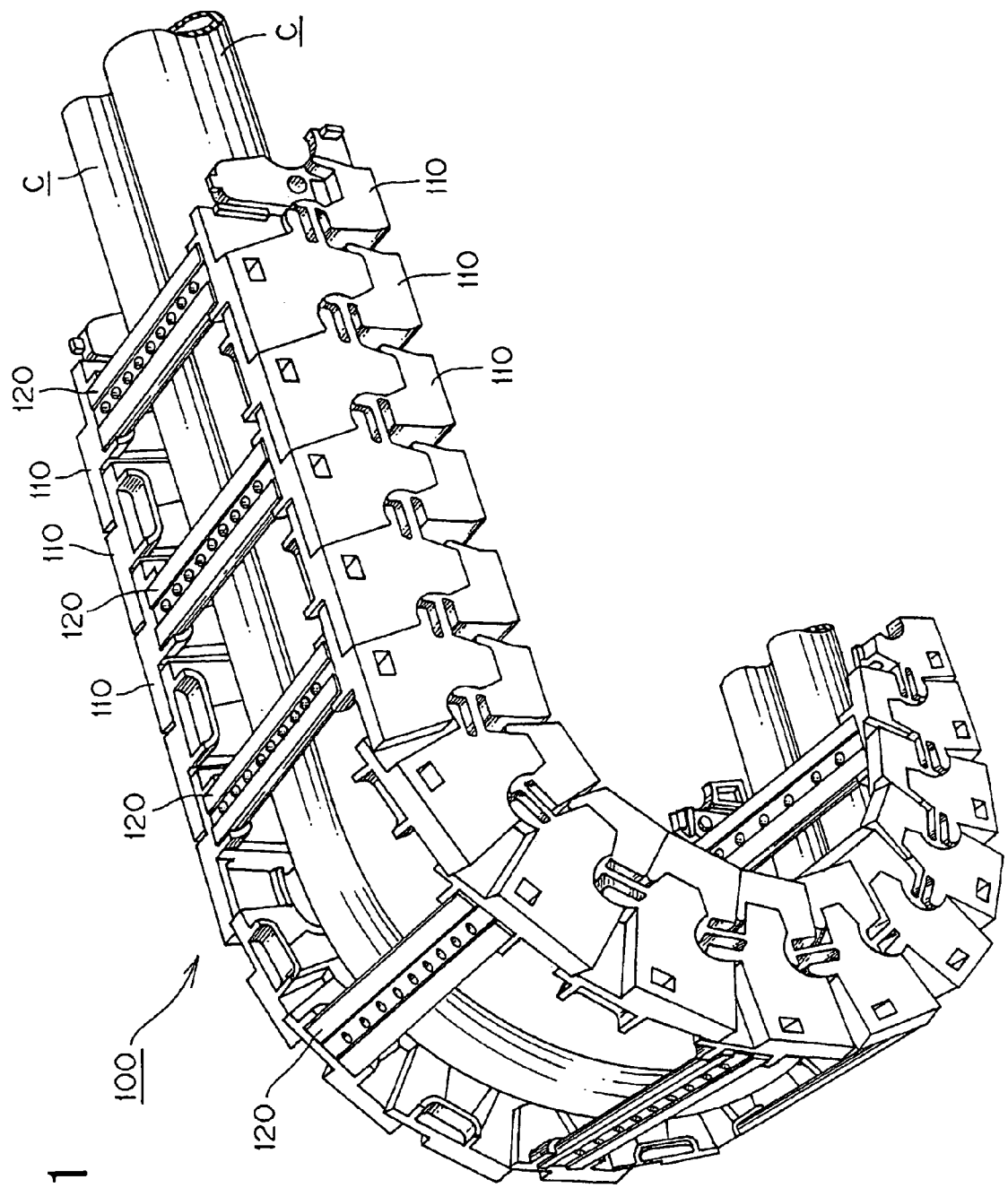
FIG. 1 is an entire view of a cable or the like protection and guide device, which is an example of the present invention.
Figure 2:
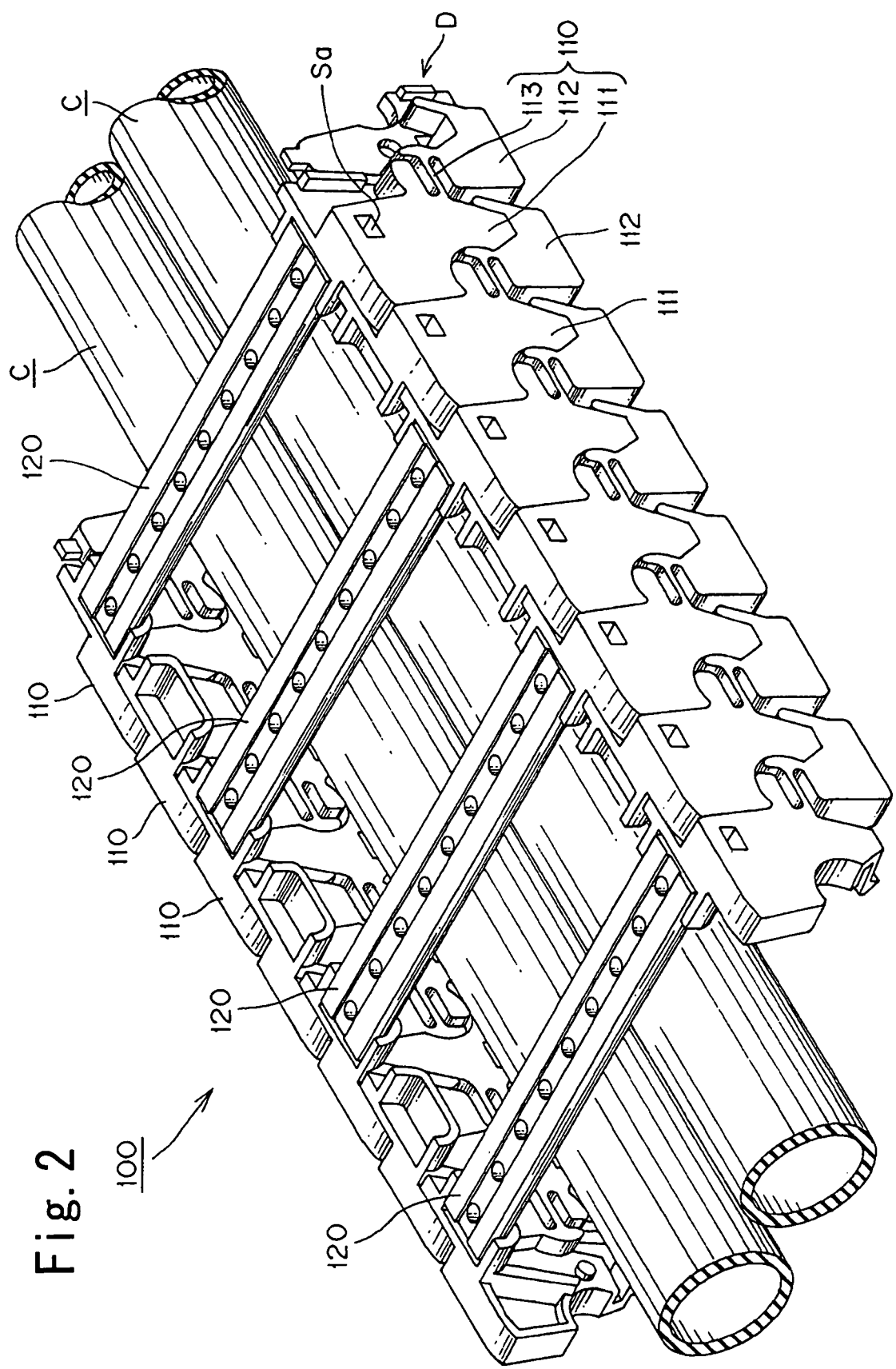
FIG. 2 is a perspective view of a linear connection state in the cable or the like protection and guide device in FIG. 1.
Figure 3:
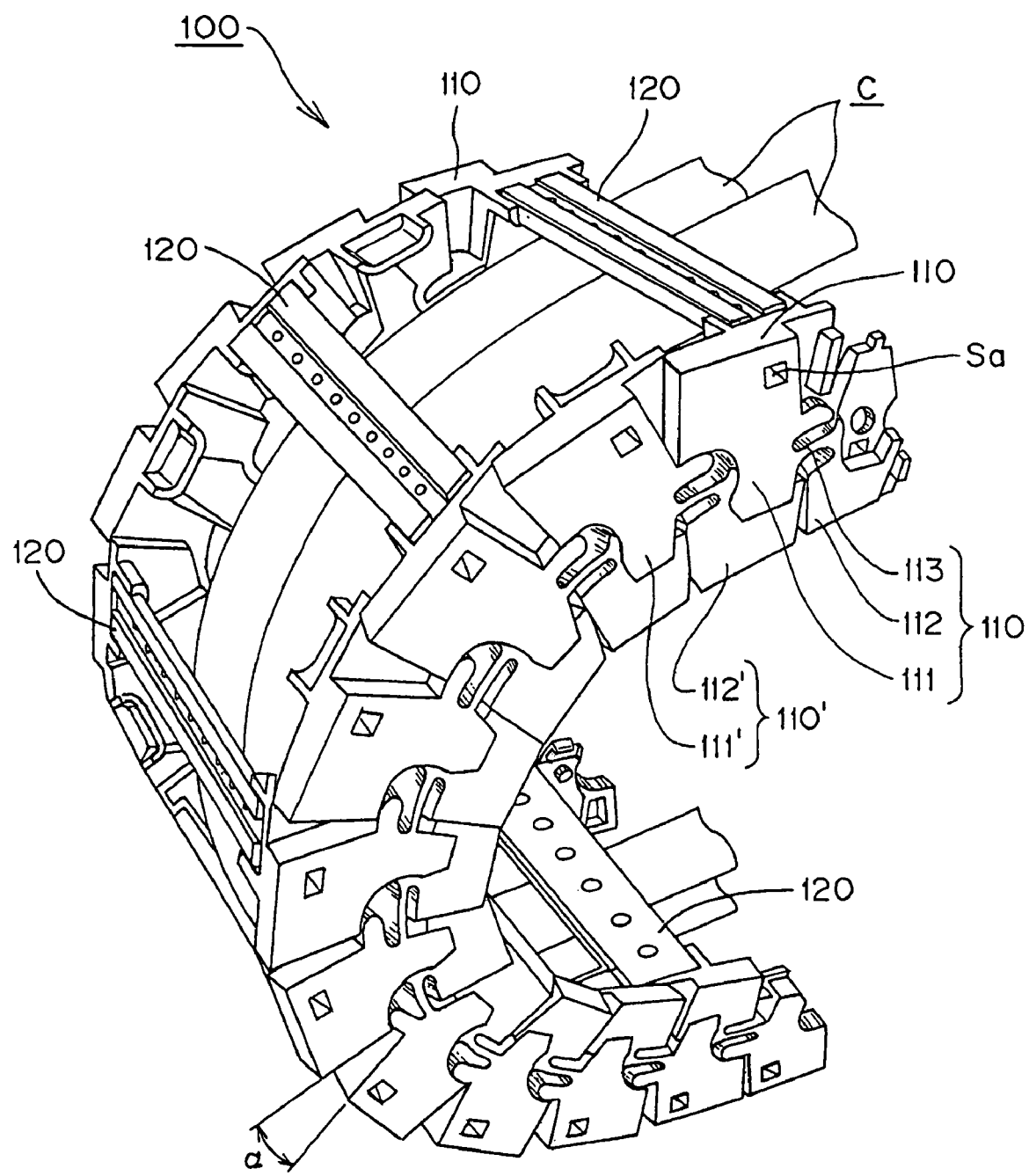
FIG. 3 is a perspective view of a flexional connection state in the cable or the like protection and guide device in FIG. 1.
Figure 4:
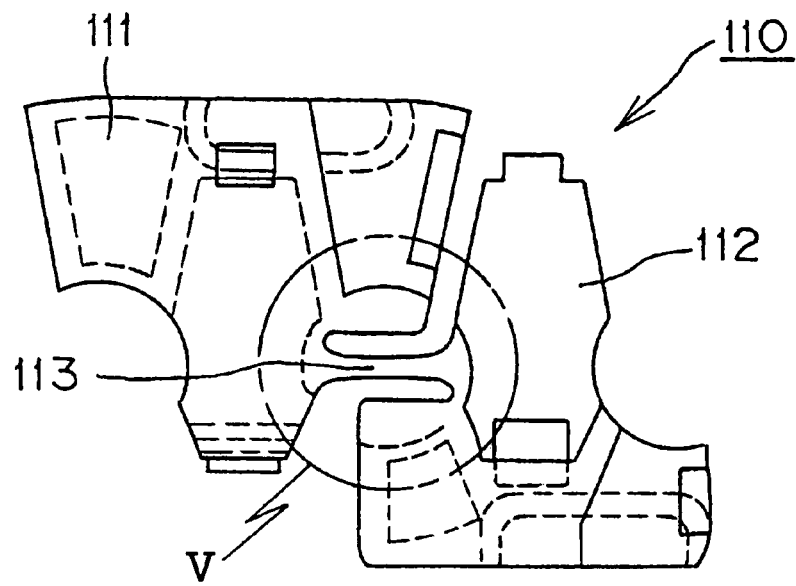
FIG. 4 is a side view of a side plate used in the cable or the like protection and guide device in FIG. 1.
Figure 5:
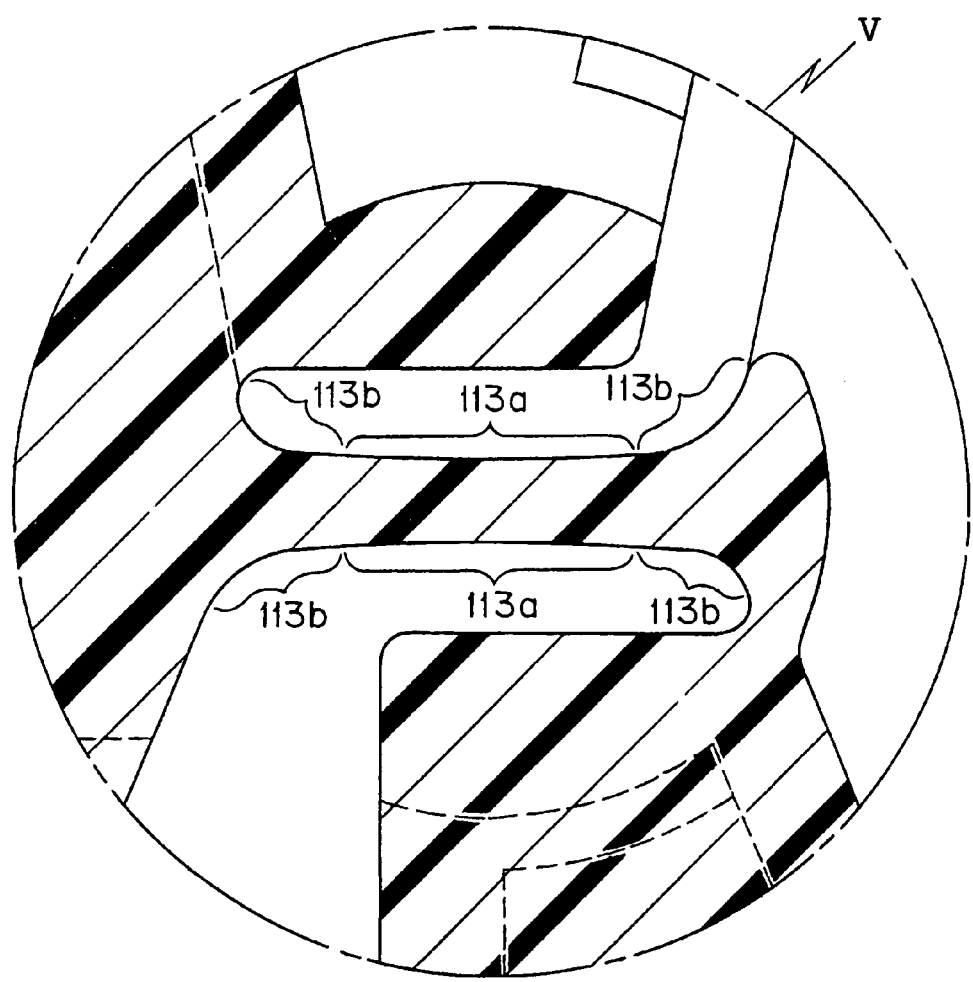
FIG. 5 is an enlarged cross-sectional view of an area in the vicinity of a coupling portion shown by V in FIG. 4.
Figure 6:
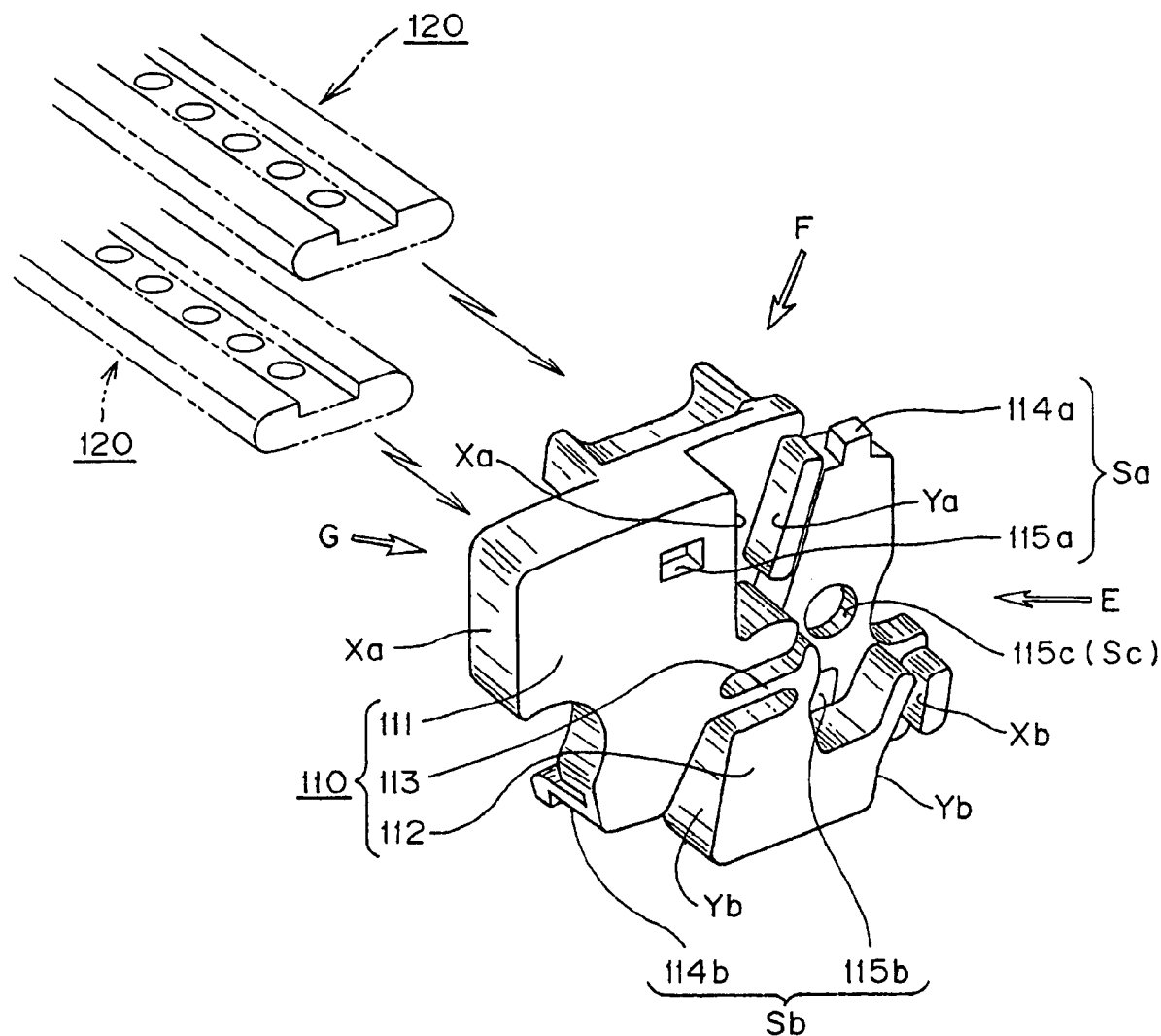
FIG. 6 is a perspective view of a side plate shown by an arrow D in FIG. 2.
Figure 7:
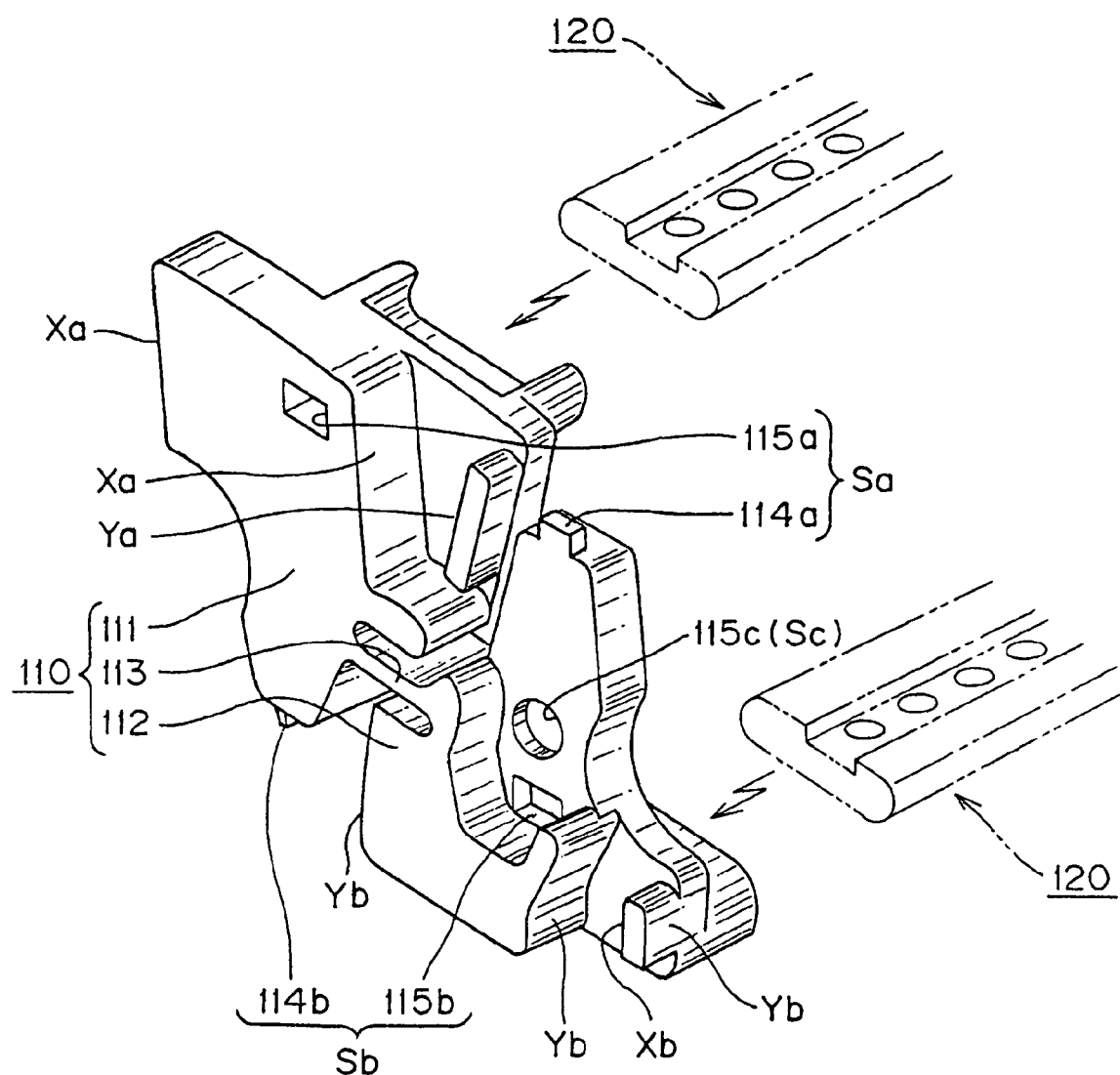
FIG. 7 is a perspective view of a side plate viewed from a direction E in FIG. 6.
Figure 8:
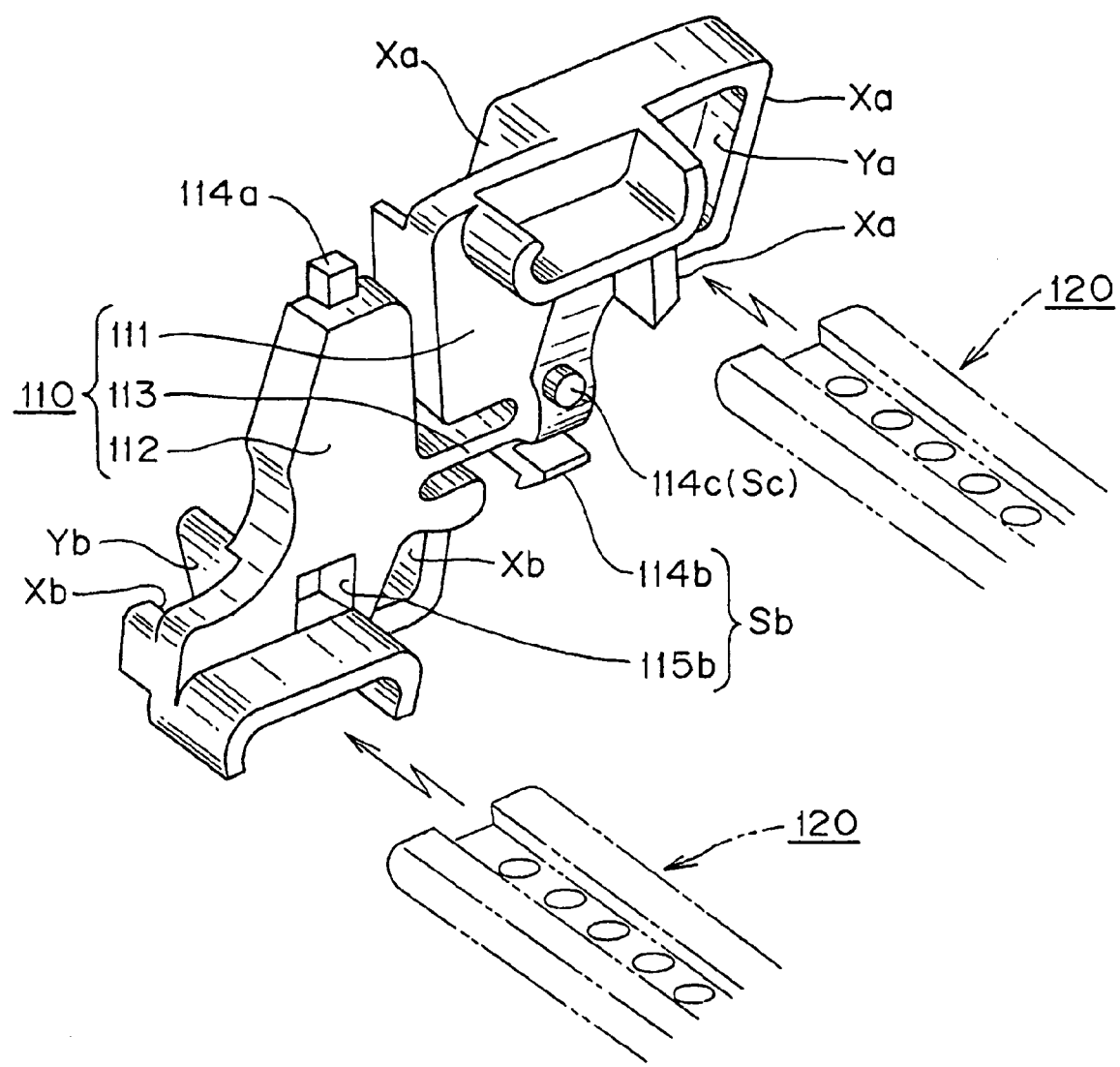
FIG. 8 is a perspective view of a side plate viewed from a direction F in FIG. 6.
Figure 9:
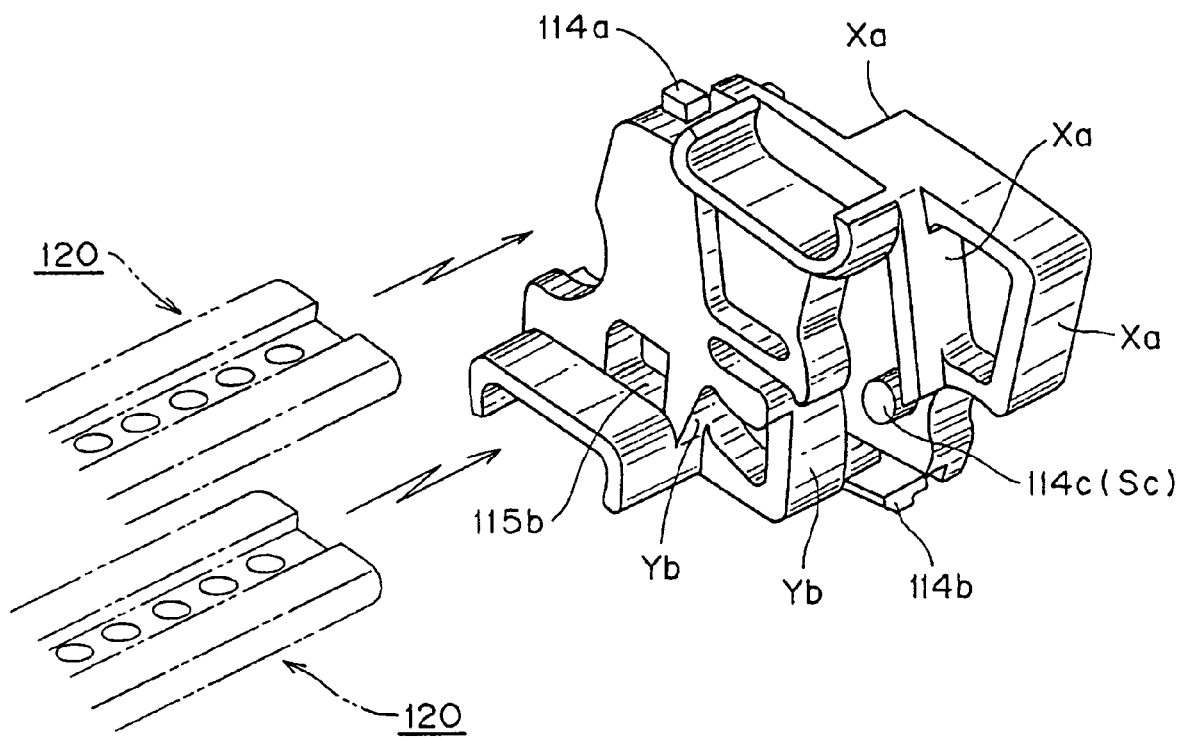
FIG. 9 is a perspective view of a side plate viewed from a direction G in FIG. 6

FIG. 1 is an entire view of a cable or the like protection and guide device 100, which is an example of the present invention. FIG. 2 is a perspective view of a linear connection state in the cable or the like protection and guide device 100 in FIG. 1. FIG. 3 is a perspective view of a flexional connection state in the cable or the like protection and guide device 100 in FIG. 1. FIG. 4 is a side view of a side plate used in the cable or the like protection and guide device 100 in FIG. 1. FIG. 5 is an enlarged cross-sectional view of an area in the vicinity of a coupling portion shown by V in FIG. 4. FIGS. 6 to 9 are perspective views of the side plate used in the cable or the like protection and guide device 100, particularly, FIG. 6 is a perspective view of a side plate shown by an arrow D in FIG. 2. FIG. 7 is a perspective view of a side plate viewed from a direction E in FIG. 6. FIG. 8 is a perspective view of a side plate viewed from a direction F in FIG. 6. FIG. 9 is a perspective view of a side plate viewed from a direction G in FIG. 6.

The cable or the like protection and guide device 100, which is an example of the present invention, is used for protecting and guiding cables or the like C such as electric cables, which connect between a movable portion and a stationary portion in a semiconductor device, a pharmacy development testing device, a door opening/closing device for a vehicle or the like to carry out transmission and supply of electric signal, and, hoses, which supply pressure liquid or pressure gas. The cable protection and guide device is longitudinally connected between the movable portion and the stationary portion (not shown). The device 100 can exhibit a linear position or a flexional position in accordance with relatively remote movement conditions between the movable portion and the stationary portion.

As shown in FIGS. 1 to 3, the cable or the like protection and guide device 100 is formed in such a manner that a number of pairs of right and left spaced side plates 110, 110 are connected to each other in a longitudinal direction. Connecting arms 120 are bridged over flexional inner circumferential sides and flexional outer circumferential sides of these side plates 110, 110 with alternate arrangement intervals of the side plates 110, 110 so that a cable (cables) or the like C is accommodated in a cable accommodating space with a rectangular section, surrounded by pairs of right and left side plates 110, 110. The connecting arms 120, 120 arranged on the flexional inner circumferential side and the flexional outer circumferential side in a bridged manner along the longitudinal direction.

It is noted that the above-mentioned movable portion and stationary portion are not shown in FIG. 1. Further, although, in this example the connecting arms 120 are bridged in alternate arrangement intervals with respect to the side plates 110, 110 connected to each other in a large number, for example they may be bridged by the correspondence of 1 to 1 in the respective side plates 110 connected to each other in a large number.

And the side plates 110, 110 used in the example are symmetrical in a spaced right and left pair. That is the plate 110 is integrally formed of a front side plate portion 111 connected to a preceding side plate 110', a rear side plate portion 112 connected to a subsequent side plate 110 and a flexible coupling portion 113 interposed between the front side plate portion 111 and the rear side plate portion 112 in an integrated manner. Plate 110 is molded by a fatigue resistant resin material (produced by Du Pont (Registered trade mark)) in which an elastomer or rubber component is compounded into polyamide resin or polybutylene terephthalate resin.

Between the rear side plate portion 112 of the preceding side plate (not shown) and the front side plate portion 111 of the side plate 110 subsequently connected to the rear side plate portion 112 are, as shown in FIGS. 6 to 9, respectively provided a flexional outer circumferential side concave portion/convex portion engagement mechanism Sa, a flexional inner circumferential side concave portion/convex portion engagement mechanism Sb and a concave portion/convex portion engagement mechanism Sc adapted in the vicinity of a coupling portion 113, which are engaged to each other. Side plates 110, 110 adjacent to each other through these concave portion/convex portion engagement mechanisms Sa, Sb and Sc are attachable to and detachable from each other. And, maintenance of the cable or the like protection and guide device 100 can be easily attained during connection and disconnection of the side plates 110, 110.

The concave portion/convex portion engagement mechanism Sa adapted on the flexional outer circumferential side of the example of the present invention comprises an engagement protrusion 114a composed of a hook-shaped engagement hook and a window-shaped hole 115a to be engaged, which detachably engages the engagement protrusion 114a composed of a hook-shaped engagement hook. The concave portion/convex portion engagement mechanism Sb adapted on the flexional inner circumferential side comprises an engagement protrusion 114b composed of a hook-shaped engagement hook and a window-shaped hole 115b to be engaged, which detachably engages the engagement protrusion 114b composed of a hook-shaped engagement hook.

And the concave portion/convex portion engagement mechanism Sc adapted in the vicinity of a coupling portion 113 of the side plate 110 comprises an engagement protrusion 114c composed of a cylindrical engagement pin and a window-shaped hole 115c to be engaged, which detachably engages the engagement protrusion 114c composed of the engagement pin.

Further, between a stepped, offset side surface of a front side plate portion 111 positioned on a flexional outer circumferential side rather than a coupling portion 113 of the side plate 110 and a front end of the front side plate portion of the subsequent side plate (not shown) and between a stepped, offset side surface of a rear side plate portion 112 positioned on a flexional inner circumferential side rather than the coupling portion 113 of the side plate 110 and a front end of the rear side plate portion of the subsequent side plate (not shown) are formed two sets of linear position holding surfaces each holding a linear connection state of the side plate 110, that is a flexional outer circumferential side linear position holding surface Xa and a flexional inner circumferential side linear position holding surface Xb, respectively.

Further, between a stepped, offset side surface of a rear side plate portion 112 positioned on a flexional inner circumferential side rather than a coupling portion 113 of the side plate 110 and a front end of the rear side plate portion of the subsequent side plate (not shown) and between a stepped, offset side surface of a front side plate portion 111 positioned on a flexional outer circumferential side rather than the coupling portion 113 of the side plate 110 and a stepped, offset side surface of a rear side plate portion of the subsequent side plate (not shown) are formed two sets of flexional position restricting surfaces each restricting a flexional connection state of the side plate 110, that is a flexional inner circumferential side flexional position restricting surface Yb and a flexional outer circumferential side flexional position restricting surface Ya, respectively.

Additionally, the above-mentioned coupling portion 113 includes a sheet-shaped central flexion allowable region 113a and proximal continuous regions 113b, 113b. The proximal continuous regions respectively having an increased plate thickness toward a front side plate portion 111 and a rear side plate portion 112 from this central flexion allowable region 113a. The central allowable regions 113a has a cross-sectional side view entirely constricted to a Japanese hand drum (tsuzumi).

As explained above, in the cable or the like protection and guide device 100 of the present invention, during linear position holding as shown in FIG. 2, the flexional outer circumferential side linear position holding surface Xa and the flexional inner circumferential linear position holding surface Xb abut on each other while the flexional inner circumferential side flexional position restricting surface Yb and the flexional outer circumferential side flexional position restricting surface Ya are respectively opened so that the linear position is reliably held without applying a load to the coupling portion 113. And during flexional position restriction as shown in FIG. 3, the flexional inner circumferential side flexional position restricting surface Yb and the flexional outer circumferential flexional position restricting surface Ya abut on each other while the flexional outer circumferential side linear position holding surface Xa and the flexional inner circumferential side linear position holding surface Xb are respectively opened so that the flexional position is reliably held without applying a load to the coupling portion 113.

It is noted that the maximum opening angle α formed by the flexional inner circumferential side flexional position restricting surface Yb and the flexional outer circumferential side flexional position restricting surface Ya can be set at a desired angle in accordance with the number of pairs of side plates and flexion radius of the side plate 110 formed in a continuous flexional position.

Therefore, in the cable or the like protection and guide device 100 of the present example, the number or parts and the amount of assembly can be reduced. And since adjacent side plates 110 become attachable to and detachable from each other through three sets of concave portion/convex portion engagement mechanisms Sa, Sb and Sc provided on the flexional outer circumferential side and the flexional inner circumferential side, maintenance of the device during connection and disconnection of the side plates can be easily attained. And since the side plate 110 is molded by a fatigue resistant resin material in which an elastomer or rubber component is compounded into polyamide resin or polybutylene terephthalate resin, the elastomer or the rubber component adds strong flexibility to impact resistance by being compounded into polyamide resin or polybutylene terephthalate resin. Thus excellent fatigue resistance to repeated flexion can be exhibited. Further breakage, which is liable to occur in the coupling portion 113 of the side plate 110 due to the repetition of flexional operations, is prevented and an excellent fatigue resistance can be exhibited. The cable or the like protection and guide device of the invention can be preferably used by suppressing wear powders in the slide portion of the side plate 110 and can thus be used in a clean environment. Thus the effects of the present invention are very large.

DESCRIPTION OF REFERENCE NUMERALS

100 . . . Cable or the like protection and guide device
110 . . . Side plate
111 . . . Front side plate portion
112 . . . Rear side plate portion
113 . . . Coupling portion
114a . . . Flexional outer circumferential side engagement protrusion
114b . . . Flexional inner circumferential side engagement protrusion
115a . . . Flexional outer circumferential side hole to be engaged
115b . . . Flexional inner circumferential side hole to be engaged
114c . . . Engagement protrusion
115c . . . Hole to be engaged
120 . . . Connecting arm
Sa, Sb, Sc . . . Concave portion/convex portion engagement mechanism
Xa . . . Flexional outer circumferential side linear position holding surface
Ya . . . Flexional outer circumferential side flexional position restricting surface
Xb . . . Flexional inner circumferential side linear position holding surface
Yb . . . Flexional inner circumferential side flexional position restricting surface
C . . . Cable (Cables) or the like
α . . . Maximum opening angle between flexional position restricting surfaces The invention has been set forth by way of Example. Those skilled in the art will recognize that the invention my be modified or changed without departing from the spirit and the scope of the claims appended below.

The invention claimed is:

1. A cable protection and guide device, comprising: a number of pairs of right and left side plates spaced apart from each other; each of said side plates include flexional inner circumferential sides and flexional outer circumferential sides; said pairs of side plates are connected to each other in a longitudinal direction; connecting arms; said connecting arms are bridged over said flexional inner circumferential sides at predetermined intervals; said connecting arms are bridged over said flexional outer circumferential sides at predetermined intervals; a cable is accommodated in a cable accommodating space surrounded by said side plates and said connecting arms along said longitudinal direction; each of said side plates is made of a fatigue resistant resin material and is formed of a front side plate portion connected to a preceding side plate, a rear side plate portion connected to a subsequent side plate and an integral flexible coupling portion interposed between said front side plate portion and said rear side plate portion, wherein said fatigue resistant resin material is selected from the group consisting of a polyamide resin and a polybutylene terephthalate resin compounded with an elastomer or rubber component.

2. A cable protection and guide device according to claim 1, further comprising a flexional outer circumferential side engagement protrusion on said rear side plate portion.

3. A cable protection and guide device according to claim 2, further comprising an engagement protrusion on said flexional inner circumferential side adjacent to said front side plate portion.

4. A cable protection and guide device according to claim 1, wherein said elastomer is styrene-ethylene-butylene-styrene (SEBS).

5. A cable protection and guide device according to claim 1, wherein said rubber component is selected from the group consisting of ethylene-propylene rubber (EPDM), nitrile rubber (NBR), and butyl rubber (IIR).

* * * * *

UNITED STATES PATENT AND TRADEMARK OFFICE
CERTIFICATE OF CORRECTION

| | | |
|---|---|---|
| PATENT NO. | : 7,305,815 B2 | Page 1 of 1 |
| APPLICATION NO. | : 11/634041 | |
| DATED | : December 11, 2007 | |
| INVENTOR(S) | : Akihiko Utaki et al. | |

It is certified that error appears in the above-identified patent and that said Letters Patent is hereby corrected as shown below:

Column 1, lines 36-37, after "are" delete "separtely" and insert -- separately --.

Signed and Sealed this

Twenty Second Day of April, 2008

JON W. DUDAS
*Director of the United States Patent and Trademark Office*